United States Patent [19]

Ito et al.

[11] Patent Number: 5,930,823

[45] Date of Patent: Jul. 27, 1999

[54] SHARED DATA STORAGE FOR TWO HOSTS WITH A STORAGE MANAGER THAT PERMITS EACH HOST TO EXCLUSIVELY READ OPERATING SYSTEM

[75] Inventors: Kazuhiko Ito; Masahiro Mizuno; Hitoshi Yamamoto, all of Tokyo, Japan

[73] Assignee: Mitsubishi Denki Kabushiki Kaisha, Tokyo, Japan

[21] Appl. No.: 08/835,641

[22] Filed: Apr. 10, 1997

[30] Foreign Application Priority Data

Sep. 9, 1996 [JP] Japan .................................. 8-238013

[51] Int. Cl.⁶ .......................... G06F 15/177; G06F 9/445; G06F 12/00; G06F 11/16
[52] U.S. Cl. .......................... 711/152; 364/187; 364/134; 395/182.11
[58] Field of Search .................................. 364/187, 134; 395/182.09, 182.11, 182.1, 182.03, 652, 651, 182.08; 711/111, 150, 151

[56] References Cited

U.S. PATENT DOCUMENTS

| 3,864,670 | 2/1975 | Inoue et al. ............................ 395/182.1 |
| 4,378,588 | 3/1983 | Katzman et al. ........................ 364/200 |
| 4,621,318 | 11/1986 | Maeda ...................................... 364/134 |
| 4,739,469 | 4/1988 | Oshiage et al. .......................... 364/187 |
| 4,803,618 | 2/1989 | Ita et al. ................................... 364/134 |
| 5,155,729 | 10/1992 | Rysko et al. ........................... 395/185.09 |
| 5,363,502 | 11/1994 | Kagimasa et al. ..................... 395/182.04 |
| 5,535,411 | 7/1996 | Speed et al. ............................. 395/652 |
| 5,638,507 | 6/1997 | Akai et al. .............................. 395/182.11 |
| 5,726,895 | 3/1998 | Kumakura et al. ..................... 364/134 |
| 5,729,675 | 3/1998 | Miller et al. ........................... 395/182.11 |

FOREIGN PATENT DOCUMENTS

| 0212425 | 3/1987 | European Pat. Off. . |
| 0240616 | 10/1987 | European Pat. Off. . |
| 0320274 | 6/1989 | European Pat. Off. . |
| 0415548 | 3/1991 | European Pat. Off. . |
| 0486304 | 5/1992 | European Pat. Off. . |
| 0588521 | 3/1994 | European Pat. Off. . |
| 56-127229 | 10/1981 | Japan . |
| 2162413 | 6/1990 | Japan . |
| 4308917 | 10/1992 | Japan . |

*Primary Examiner*—Eddie P. Chan
*Assistant Examiner*—Yamir Encarnación
*Attorney, Agent, or Firm*—Leydig, Voit & Mayer, Ltd.

[57] ABSTRACT

A data storage system in which system activation is performed in cooperation with two host systems sharing a data storage system. A determination unit determines which of the two host systems makes access to the data storage system. A system access control unit controls access to the data storage system from the host systems to prevent competition between the host systems. Each of the host systems indicates completion of system activation to the other host system.

11 Claims, 12 Drawing Sheets

| DISK CONTROL TABLE 1400 | 1410 MASTER | SLAVE 1420 |
|---|---|---|
| DISK #0 | O | × |
| DISK #1 | × | O |

O : ACCESS PERMITTED
× : ACCESS PROHIBITED

DISK CONTROL TABLE AT SYSTEM ACTIVATION

Fig.11

| DISK CONTROL TABLE 1400 | 1430 MASTER | SLAVE 1440 |
|---|---|---|
| DISK #0 | × | O |
| DISK #1 | × | O |

O : ACCESS PERMITTED
× : ACCESS PROHIBITED

DISK CONTROL TABLE AT MASTER FAILURE

SHARED DATA STORAGE FOR TWO HOSTS WITH A STORAGE MANAGER THAT PERMITS EACH HOST TO EXCLUSIVELY READ OPERATING SYSTEM

BACKGROUND OF THE INVENTION

The present invention relates to a data storage system to be shared by two host systems and to a data storage control method for a data storage system shared by the two host systems.

DESCRIPTION OF THE RELATED ART

Conventional example 1

Figure 13:
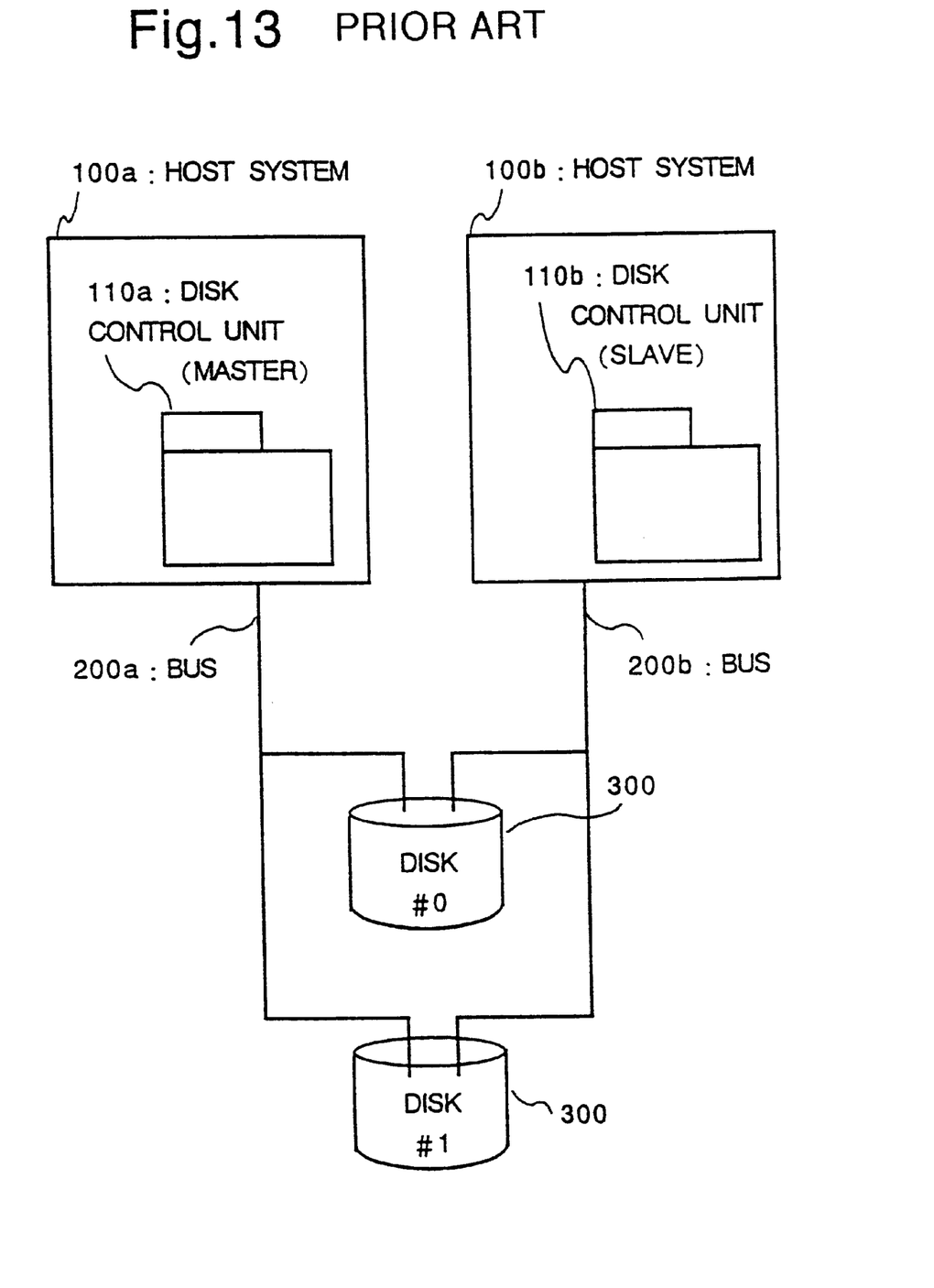
FIG. 13 is a configuration of the conventional system sharing one disk subsystem by two host systems.

FIG. 13 is a configuration of a system in which one disk subsystem is shared by two host systems.

In FIG. 13, a current (master) host system 100*a*, a spare (slave) host system 100*b* are shown. A disk control unit 110*a* of host system 100*a*, and a disk control unit 110*b* of host system 100*b* are shown. Each of disks 300 is one of a plurality of disks shared by host systems 100*a* and 100*b*. A bus 200*a* connects disks 300 with host system 100*a*, and a bus 200*b* connects disks 300 with host system 100*b*.

An example of a system that adopts such configuration is a duplex system.

The duplex system, which is also called a stand-by system, consists of a current system and a spare system each of which has a processor which performs online processing. The spare system is usually used for jobs with lower priority such as batch processing, and so on. When a fault occurs in the current system, the jobs being performed by the spare system are terminated, and the faulty device is switched over to the spare system so that the processing may be resumed. The system of keeping the spare system always in a wait-and-ready state for prompt service is called a hot stand-by system. (Handbook for Electronics Information and Communication Engineers; edited by Electronics Information Communications Academy, published on Mar. 30, 1988)

There is also a system in which the spare system is not placed in a wait-and-ready state for starting service. This system is called a cold stand-by system. With the cold stand-by system, when a fault occurs in the current system, an activation operation such as the reading of the operating system in a shared disk subsystem is implemented to make the spare system ready for starting services. In other words, with the cold stand-by system, an activation of the current host system is first carried out, and when a fault occurs in the current system, the spare system is activated. The activation operation of each host system is carried out similarly to the ordinary system because the host system and disk subsystem becomes one on one. On the other hand, with the hot stand-by system, the problem given below occurs at the time of activation, because accesses from both the master and slave systems are made to the shared disk subsystem.

The problem is, while an access is being made from the slave system, an access from the master would not be accepted, which can result in the halting and hanging up the operation of the master system. Because the host systems operate at the basic input output system (BIOS) level during system activation, operations such as retry are not performed as fully as when a driver for controlling a disk that runs under the operating system is loaded.

For the above-mentioned reason, it was difficult to configure a duplex system. Moreover, there was a problem that even the duplex system configuration had to functionally diminish to place the slave system in the cold stand-by.

On top of that, to make the slave system hot stand-by, it was necessary for the duplex system to realize a system in which the master and slave systems perform system activation in cooperation with each other.

Conventional example 2

Other problems of a system having the same configuration as the above Example 1 are described next. When a fault has occurred to the master (or slave), the following problems arise in shifting from a dual (the master and the slave) operation to a single (the slave or master) operation.

The biggest problem is, in order to shut down operation of the master (or slave) in which a fault has occurred, because the master (or slave) with the fault accesses the data storage as well, the operation of the slave (or master) making an access to the same data storage may be disrupted.

Yet another problem is, while only the slave (or master) is operating (under diminished operation), and if the master (or slave) is started for the purpose of maintenance, the operation of the slave (or master) might be disrupted.

In this way, the operation of one system might interfere with the other system sharing the disk subsystem, which, in turn, could trigger a system shutdown.

PROBLEMS TO BE SOLVED BY THE INVENTION

It is the object of the present invention to overcome problems with the above-mentioned technique of the prior art. This invention provides to achieve a data storage system and a data storage controlling method which enable the master and slave systems to perform the system activation in cooperation with each other, at the time of system activation, for a data storage system shared by two host systems.

Furthermore, in the data storage system shared by two host systems, this invention realizes the data storage system including a mechanism that prevents interference with the data storage when two host systems are switched, or during the maintenance of one host system.

SUMMARY OF THE INVENTION

A data storage system connected to a first and a second host systems that run on an operating system, and accessed from the first and the second host systems may comprise a first and a second buses each of which having an interface;

a storage, connected to the first host system via the first bus and connected to the second host system via the second bus, for storing the operating system; and a storage manager, connected to the first host system via the first bus and to the second host system via the second bus, for allowing one of the first and the second host systems to exclusively read the operating system stored in the storage when the first and the second host systems are activated.

The data storage system, wherein the storage manager may be configured to be accessed before the storage is accessed when one of the first and the second host systems is activated, and wherein the storage manager may give priority to one of the first and the second host systems over the other host system in reading the operating system stored in the storage while keeping the other host system in wait-mode for reading the operating system stored in the storage, and wherein after one of the host systems may have completed the reading of the operating system stored in the storage, the storage manager allows the other host system to execute the reading of the operating system stored in the storage in order to realize the exclusive reading of the operating system by the first and the second host systems.

The data storage system, wherein the storage manager may include;

a bus switching mechanism connected to the first and second buses for selectively connecting one of the first and the second buses by switching one over the other, and for outputting a bus connection information indicating which bus is connected;

a determination unit for referring to the bus connection information output from the bus switching mechanism to make a determination which of the first and the second host systems makes an access, and;

an access control unit to exclusively control the access to the storage by the first and the second host systems according to the determination made by the determination unit so as to realize the exclusive reading of the operating system stored in the storage.

The data storage system, wherein the access control unit may freeze one of the first and the second buses.

The data storage system, wherein the storage manager may further include a read completion information storage unit to store a read completion information indicating the completion of the reading of the operating system stored in the storage by one of the first and the second host systems, and wherein the access control units may refer to the read completion information storage unit to release the exclusive control of the access to the storage after the completion of the reading of the operating system by one of the host systems.

The data storage system, wherein the reading completion information storage unit may include a first and a second read completion information storage units, which separately store the read completion information indicating the completion of the reading of the operating system by the first and the second host systems, and wherein the access control units may make one of the first and the second host systems wait to read the operating system until the other host system which has made an access earlier completes the reading of the operating system.

The data storage system, wherein the storage manager may freeze one of the first and the second buses by the access control unit in order to give priority to one of the first and the second host systems connected to the other unfrozen bus to read the operating system stored in the storage, wherein the host system connected to the other unfrozen bus may store the read completion information in one of the first and the second read completion information storage units at the time of completion of the reading of the operating system, and wherein the access control units may refer to one of the read completion information storage units to unfreeze the frozen bus.

The data storage system, wherein the storage may be a disk unit and the interface is a Small Computer System Interface (SCSI), and wherein the access control units freeze the bus by delaying a reply to the disk activation command of the SCSI.

A data storage control method with a first and a second host systems activated by reading an operating system and connected to a data storage system which may store the operating system, and the data storage system may have a storage and a storage manager may comprise steps of;

reading the operating system in the storage to one of the first and the second host systems;

locking an access to the storage from the other host system by the storage master;

unlocking the access from the other host system by detecting the completion of the reading of the operating system from the one of the first and the second host systems; and reading the operating system in the storage by the unlocked other host system.

The data storage control method, wherein the locking step may include steps of:

detecting an access request to the storage from the other host system; and delaying a reply to the access request detected by the access request detecting step.

The data storage control method, may further comprise step of storing a read completion information indicating the completion of the reading of the operating system from one of the first and the second host systems, and wherein the unlocking step may include step of referring to the read completion information stored through the read completion information storing step to unlock the access from the other host system.

A data storage system connected to a first and a second host systems and accessed from the first and the second host systems may comprise:

a first and a second buses each of which having an interface;

a storage, connected to the first host system via the first bus and connected to the second host system via the second bus, for storing the data;

an access information set unit for presetting an access information indicating the permissibility of the access to the storage from the first and the second host systems;

a first access control unit for referring to the access information set in the access information set unit to control the access to the storage from the first host system; and a second access control unit for referring to the access information set in the access information set unit to control the access to the storage from the second host system.

The data storage system, may further include an access information change unit for changing the access information, and wherein one of the first and the second access control units for referring to the access information at a certain time interval to dynamically control the access to the storage from one of the first and the second host systems.

The data storage system, may further include a fault detect unit for detecting a fault in one of the first and the second host systems, and wherein the access information change unit may change the access information so as to prohibit the access to the storage from the host system in which a fault is detected by the fault detect unit and to permit the access to the storage from the other host system.

BRIEF DESCRIPTION OF THE DRAWINGS

Other objects features, and advantages of the invention will be apparent from the following description when taken in conjunction with the accompanying drawings.

In the drawings.

DESCRIPTION OF THE PREFERRED EMBODIMENTS

Embodiment 1.

Embodiment 1 explains a case in which a storage medium is a disk and a storage medium manager is a disk manager. The disk subsystems are connected to the host system by Small Computer System Interface (SCSI) buses.

Figure 1:
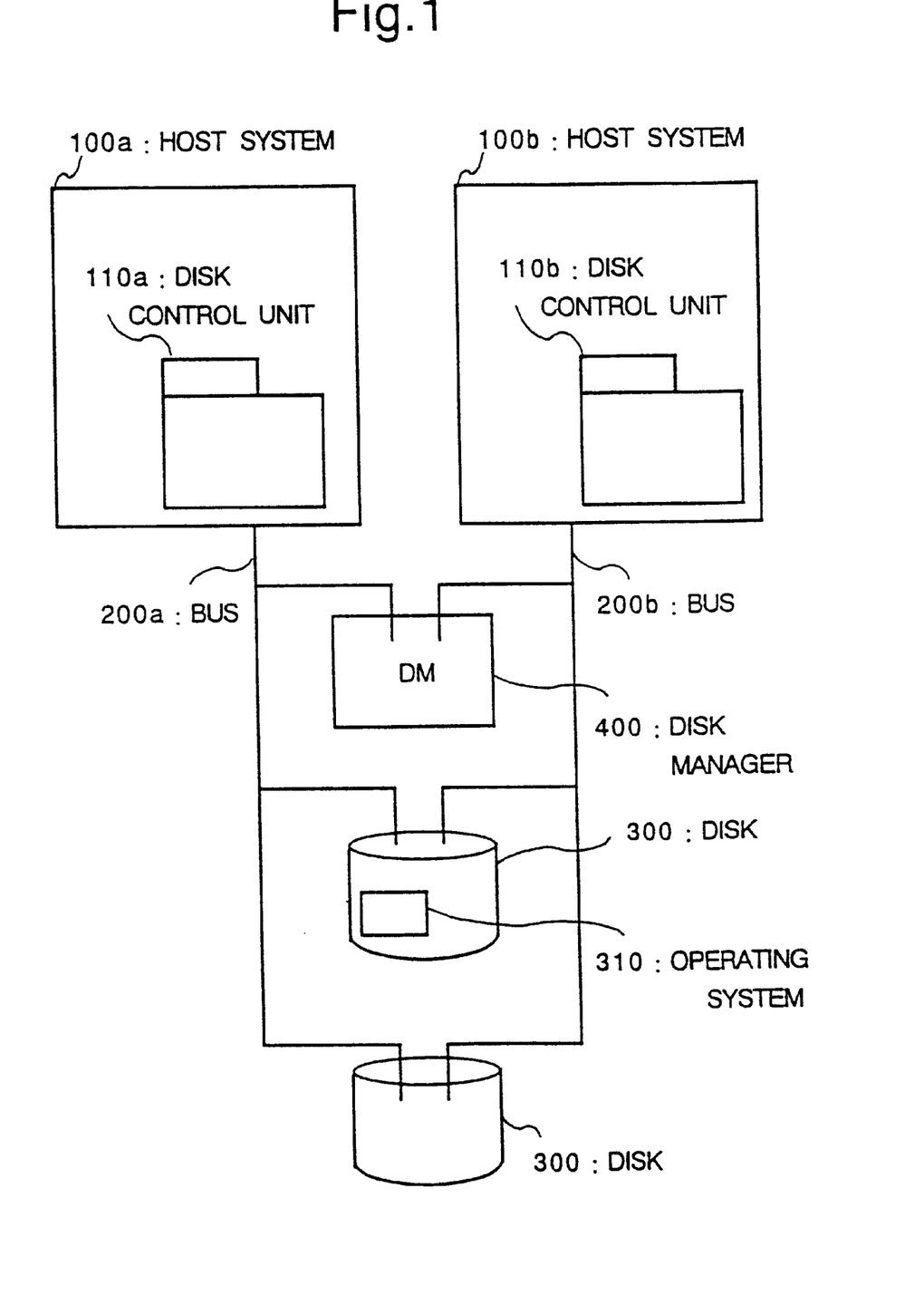
FIG. 1 is a configuration of a data storage system of the present invention.

FIG. 1 is a configuration of the data storage system of this invention.

As shown in FIG. 1, a disk manager 400 is added to the conventional configuration shown in FIG. 13. A disk 300 stores an operating system 310 to be loaded onto both the master and slave host systems 100a and 100b. The configuration of this embodiment is provided with two SCSI buses 200a and 200b connected to the master and slave host systems. The remaining configuration is the same as the conventional configuration shown in FIG. 13.

Although it is assumed the duplex system is configured with two host systems sharing the disk subsystem, the dual system in which two host systems perform the same operation is also acceptable.

Disk manager 400 is a disk subsystem control mechanism connected to the shared disk subsystem.

Disk manager 400 is a device that can be accessed from both the master and slave host systems just as disk 300. Disk manager 400 appears as a disk unit to the host systems. Hereinafter, the master host system is simply called the master. Also, the slave host system is called the slave.

Figure 2:
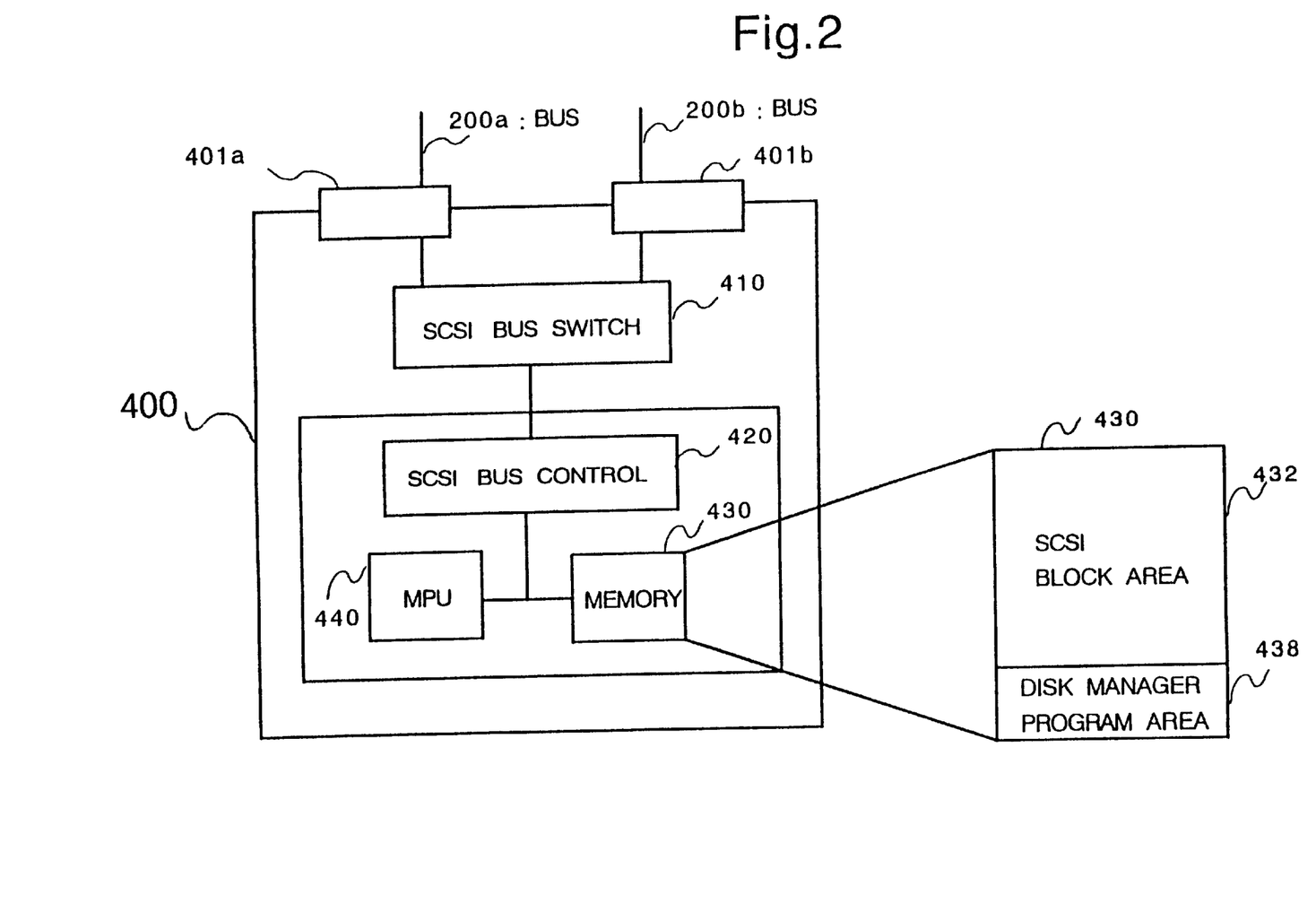
FIG. 2 is a configuration of disk manager of the data storage system of this invention.

FIG. 2 shows a configuration of disk manager 400.

Disk manager 400 is connected to two SCSI buses 200a and 200b, each of which is connected with the master and the slave. The SCSI buses are connected to an SCSI bus switch 410 via a master port 401a and a slave port 401b, respectively. In this manner, disk manager 400 has a dual port disk configuration by which one SCSI bus is switched with the other whenever necessary.

SCSI bus switch 410 is connected with a SCSI bus control 420. In addition, disk manager 400 is provided with a Micro Processing Unit (MPU) 440 and a nonvolatile memory 430.

In this way, disk manager 400 is recognized as a disk from the SCSI buses, and is capable of performing the same operation as the disk.

Data accessed via the SCSI buses is stored in a SCSI block area 432 of memory 430 of disk manager 400. Memory 430 has a disk manager program area 438. Disk manager program area 438 stores a disk manager program executed by MPU 440 to control disk manager 400.

Figure 3:
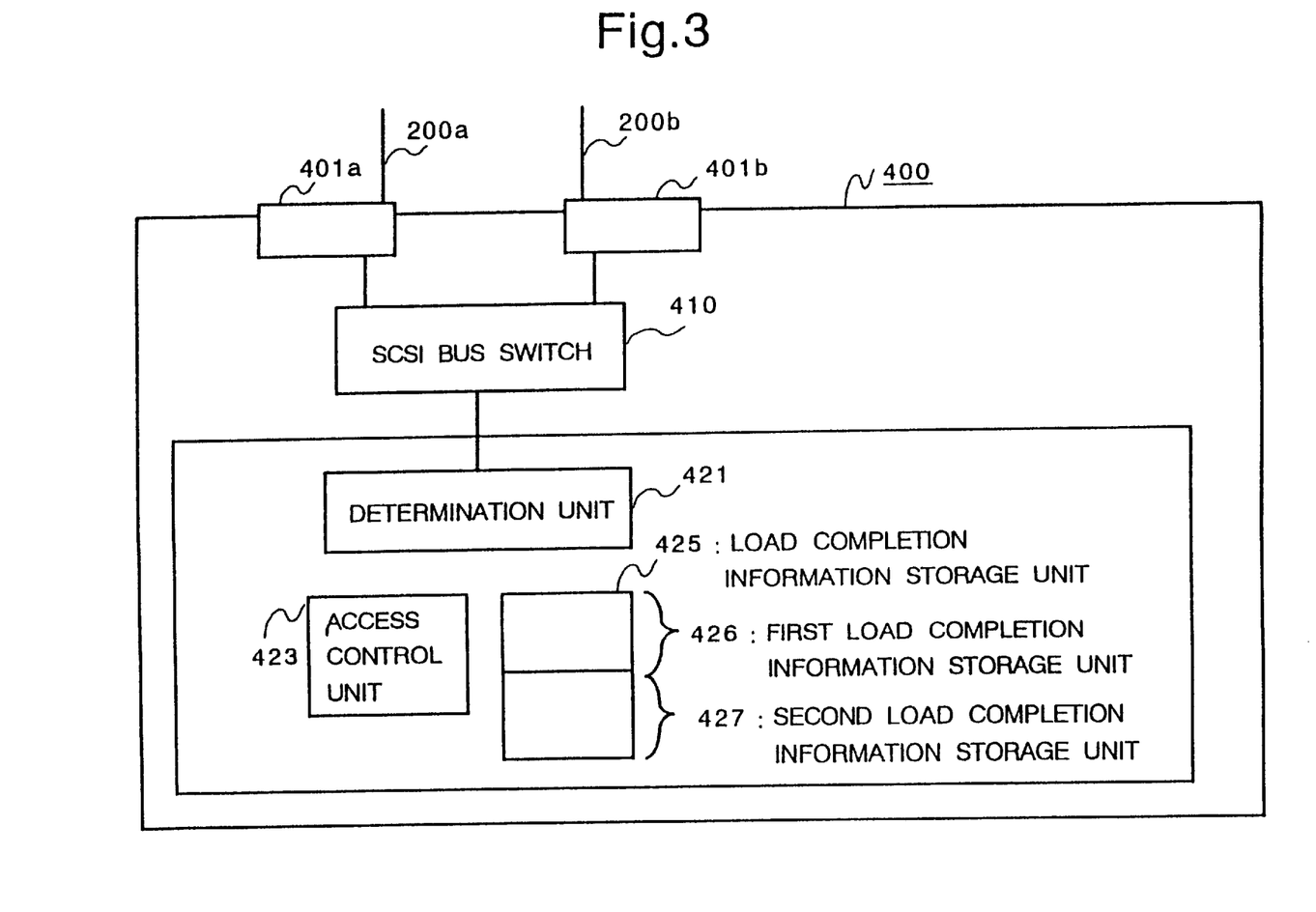
FIG. 3 is a block diagram showing functions of the data storage system of this invention.

FIG. 3 is a block diagram showing functions of the data storage system of this invention.

A determination unit 421 shown in FIG. 3 receives the port number from SCSI bus switch 410, the bus switching mechanism, and judges from which bus the access is made based on the port number. Then the host system that has made the access is determined. An access control unit 423 controls the access to the disks of the host system determined by the determination unit 421. A read (load) completion information storage unit 425 consists of a first read completion information storage unit 426 and a second read completion information storage unit 427. Access control unit 423 refers to read completion information storage unit 425, and controls accesses to the disks of each host system, which will be explained later on.

Figure 4:
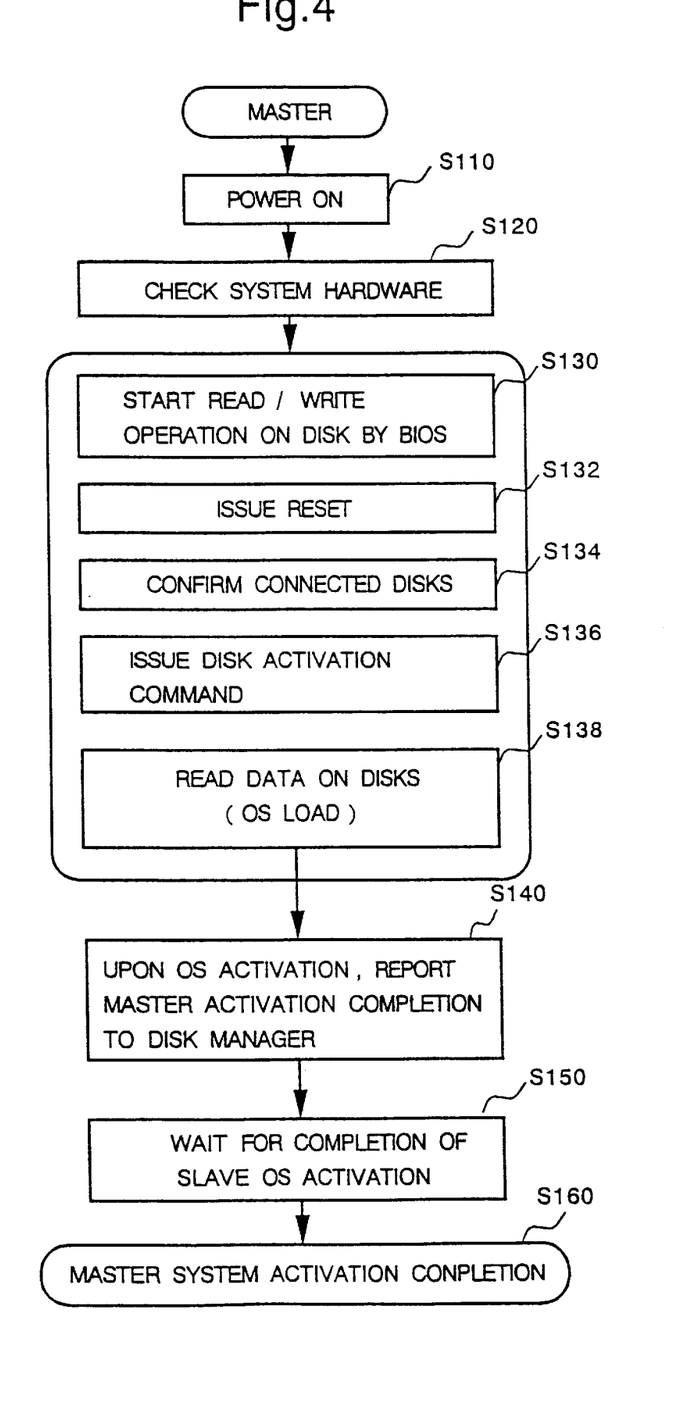
FIG. 4 is a flowchart showing steps from power on to completion of system activation of a master host system of the data storage system of this invention.
Figure 5:
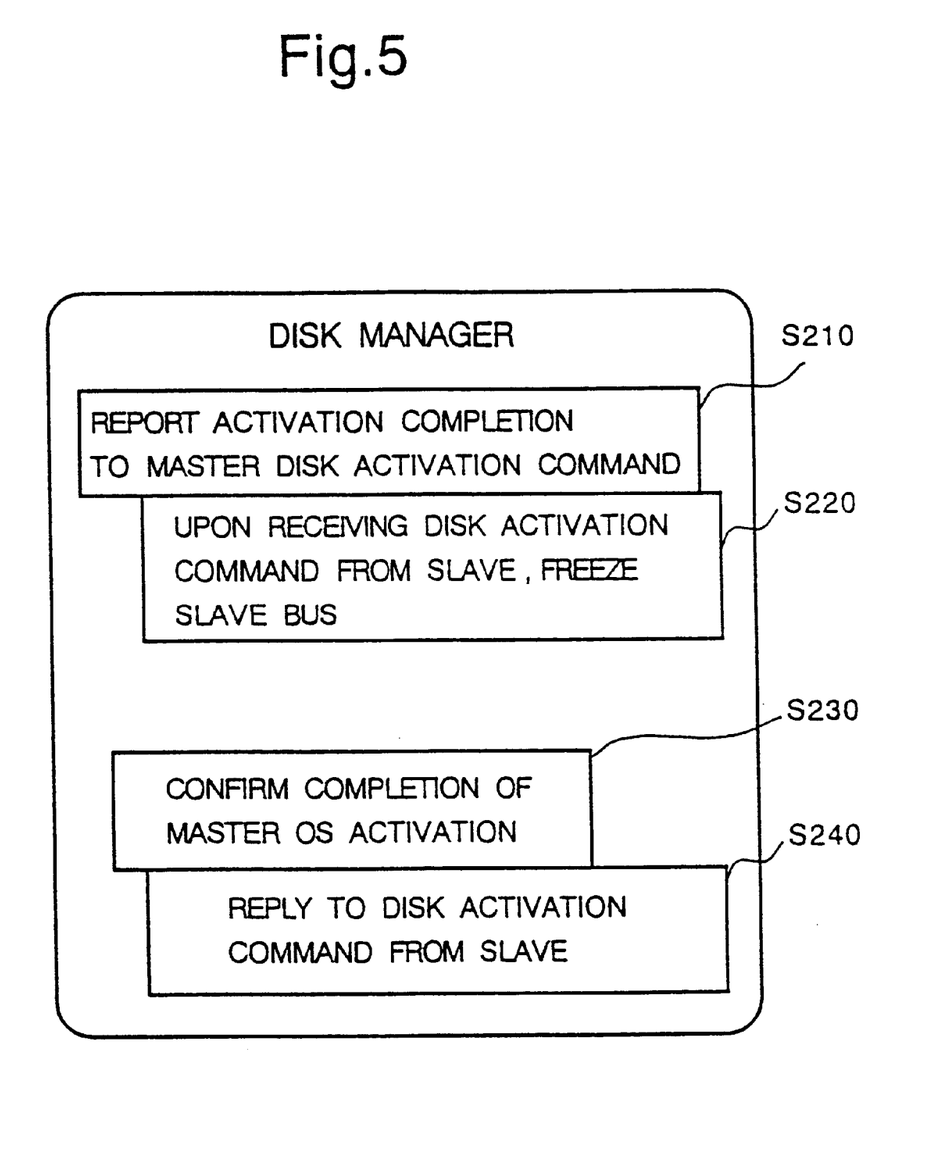
FIG. 5 is a flowchart showing an operation of the disk manager from power on to completion of system activation of the master and slave host systems of the data storage system of this invention.
Figure 6:
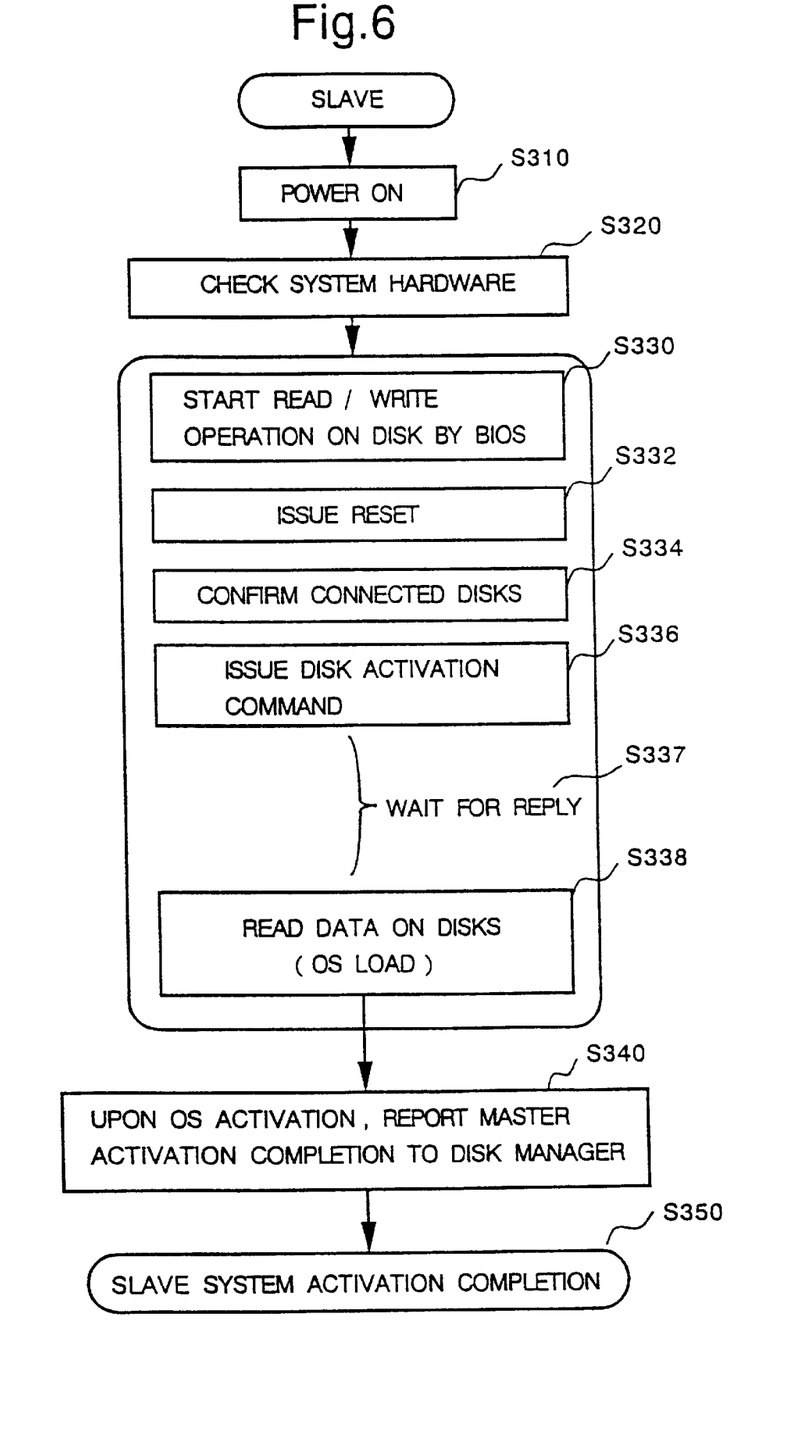
FIG. 6 is a flowchart showing steps from power on to completion of system activation of the slave host system of the data storage system of this invention.

Operation is explained more specifically with reference to FIGS. 4 to 6. In this embodiment, when power is turned on, first the master is powered on and then the slave is powered on. The same system configuration is applied to the master and the slave, and the time required for system activation after power on is more or less the same. Disk manager 400 is accessed by host systems 100a and 100b before disk 300 is accessed.

FIG. 4 shows a flow chart of the master from power on to system activation completion.

FIG. 5 is a flowchart showing the disk manager operation from power on to system activation completion of both the master and the slave.

FIG. 6 shows a flowchart from power on to system activation completion of a conventional host system.

As shown in FIG. 4, the master system activation begins when the system hardware is powered on (S110). Then, at S120, the master checks the hardware of the master system.

After the check, read/write operation of the disk starts (S130) based on the Basic Input Output System (BIOS) of the input/output control unit.

The master issues a reset (S132) to the disk subsystem. Then it issues the Target Select, Inquiry CMD, and Test Unit Ready commands to confirm the connected disks (S134). The master searches over the disk buses from the disk manager on down and issues the Start CMD command to the connected disks in a set order, (ascending or descending) of IDs, or disk identifiers. Disk manager 400 is recognized as a disk unit by the host system. Disk manager 400 is accessed from each host system before the disks are accessed. The master 100a, therefore, issues (S136) the disk activation command to disk manager 400 first.

Following the master system, the slave also starts system activation when the system hardware is powered on (FIG. 6, S310).

At S320, the slave checks its own hardware.

After the check, read/write operation of the disk starts (S330) based on the BIOS of the input/output control unit (S330).

The slave issues a reset to the disk subsystems (S332). If the operating system is already being read from the master, bus 200a connected to the master becomes valid to the disk subsystems. While bus 200a is being validated for the master, accesses from bus 200b from the slave are ignored. The disk subsystems thus ignore a reset issued from the slave. The reset issuance from the slave therefore does not interrupt the master from reading the operating system. Then, the slave issues a command to confirm the connected disks (S334). The slave searches over the disk buses from the disk manager on down, and issues the disk activation command in a set order (ascending or descending) of the IDs, or the disk identifiers. Because disk manager 400 is recognized as a disk from the host, the slave issues the disk activation command to disk manager 400 first just as the master system (S336).

Disk manager 400 receives the disk activation command from both the master and the slave. A received disk activation command is attached to a port number, which indicates whether the command is sent through the master or the slave port. Determination unit 421 of disk manager 400 refers to this port number to determine whether the disk activation command is issued from the master or the slave and then outputs to access control unit 423. Access control unit 423 responds to the disk activation command when the disk activation command is issued from the master. As shown at S210 of FIG. 5, after disk manager 400 receives the disk activation command from the master, it reports the activation completion to the master system. As shown at S220, when the disk activation command is issued from the slave, disk bus 200b of the slave is frozen when the disk activation command is received.

When bus 200b is frozen, the slave waits for the reply of the completion of the disk activation command (S337). Because time out for the response for the disk activation command is not ordinarily set, the slave waits for the reply unlimitedly until it receives a reply.

When the master receives the activation completion of the disk activation command from the access control unit 423 of disk manager 400, the master issues the disk activation command to the connected disk 300. After that, the master reads (loads) the operating system from the disk 300 (S138). After the operating system has been read (loaded), the system activation of the master is completed.

The master reports the activation completion to disk manager 400 after the system has been activated (S140). The report of activation completion is executed when the master records a completion code (activation completion flag) in the SCSI block area controlled by the disk manager.

Figure 7:
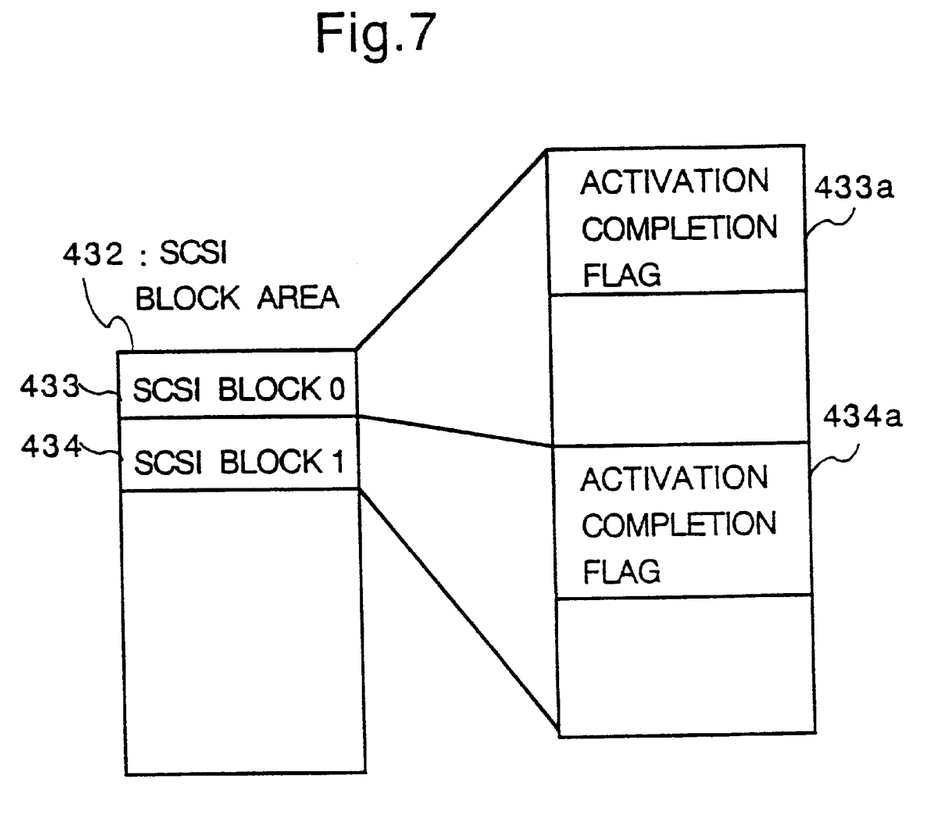
FIG. 7 shows the SCSI block area of the disk manager of the data storage system of this invention.

FIG. 7 shows the SCSI block area of the disk manager.

Because the SCSI block area of disk manager 400 is shared by the master and the slave, the activation completion report can be received as below.

SCSI block 0 can be read or written by the master, and is read-only from the slave. SCSI block 1, on the other hand, can be read or written from the slave but is read-only from the master system. Using activation completion flags 433a and 434a, the host systems of the master and the slave write in a SCSI block to which they are entitled. Other systems can detect the completion of system activation by checking the writing at the activation completion flag.

The master is provided with a writing means (program) for writing the completion code (for example, a number 1) in SCSI block 0 which is the location set for the host system in the SCSI block area of the disk manager. The writing means is assumed to be set beforehand so as to be automatically activated after the completion of the system activation. Based on the setting, the writing means records the completion code in SCSI block 0 which is the location set for the master in the SCSI block area of the disk manager. The master, then, waits for the completion of system activation of the slave (S150) while polling SCSI block 1 at an appropriate time interval.

Access control unit 423 checks the location (SCSI block 0) determined for the master in the SCSI block area of the disk manager at a certain time interval. The access control unit 423 confirms the completion of the master system activation based on the check (S230), unfreezes the bus of the slave, and sends the reply for the disk activation command (S240).

When the slave receives the activation completion for the disk activation command from access control unit 423 of disk manager 400, the slave issues the disk activation command to the connected disk 300. After that, the slave reads (loads) the operating system from the disk (S338). When the operating system has been completely read, the system activation of the slave is completed.

After the slave system activation is completed, the slave reports (S340) the activation completion to disk manager 400. The reporting of the activation completion of the slave is carried out, similarly to the master, when the slave records the completion code in the SCSI block area controlled by the disk manager. Just as the master, the slave is provided with a writing means with which to write the completion code (for instance, a numeral 1) in the location (SCSI block 1) set for the slave in the SCSI block area of the disk manager. The write means, just as that of the master, is assumed to be set beforehand so as to be automatically activated when the system activation has been completed. The writing means records the completion code in the location (SCSI block 1) set for the slave in the SCSI block area of the disk manager.

The master, by polling the SCSI block 1, knows the completion of the slave system activation by the writing of the completion code. After that, the master and slave systems start the shared operation of the disk subsystem.

FIG. 5 shows a case when the disk activation command issued from the master is received by the disk manager first. Because the master is powered on first and the configuration of the master and slave systems is identical, it is assumed the disk activation command of the master is issued first. However, because the determination unit determines from which host system the command is issued, it is possible that the disk activation command is first issued from the slave. That is, S210 and S220 in FIG. 5 can be interchangeable. If the disk activation command of the slave is issued first, the bus of the slave is frozen prior to the issuance of disk activation command from the master. Then, when the disk activation command is issued from the master, the activation completion is reported to the master. The reading of the operating system is the same as the previous case.

The operation of the disk manager is now explained.

Figure 8:
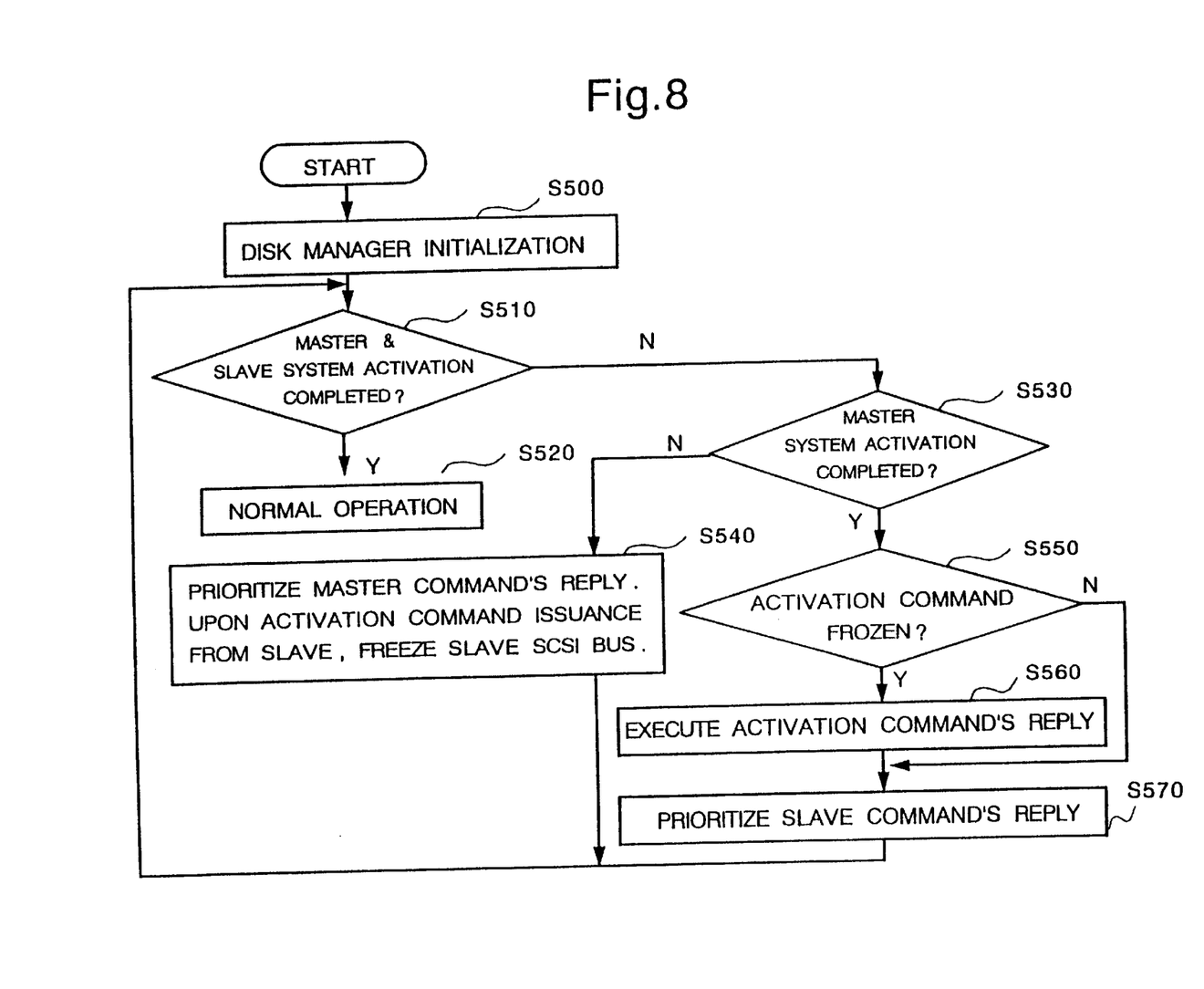
FIG. 8 is a flowchart showing an operation of the disk manager at the time of system activation of the data storage system of this invention.

FIG. 8 is a flowchart showing the operation of the disk manger at system activation.

Disk manager 400 usually responds to the operation of the master and slave systems via the SCSI buses. At system activation, disk manager 400 implements the sequential operation shown in FIG. 8.

Firstly at S500, the initialization of disk manager 400 is carried out. Then at S510, the completion of system activation is checked for both the master and slave systems. When system activation is completed, at S520, normal operation starts. If it is not completed, at S530, the completion of master system activation is checked.

If the master system activation is not completed, at S540, a reply to the master command is prioritized. At this time, if the disk activation command is issued from the slave, the SCSI bus of the slave is frozen by the access control unit. When the master system activation is completed, at S550, the activation command is checked to determine whether or not it has been frozen. When the activation command is frozen, at S560, the reply to the activation command is executed. If the activation command is not frozen, processing at S560 is skipped because the slave is not in the wait mode for the command's reply. Then, at S570, the reply to the slave system command is prioritized and executed.

The access control unit controls accesses of the master and slave to the disks at the time of system activation so that the reading of the operating system would be conducted exclusively. Thus, competition between the master and slave systems would not occur while reading the operating system. Non-competition allows the prevention of errors while the operating system is being read with the BIOS.

Embodiment 2

This embodiment explains a data storage system provided with a system control mechanism for controlling competition between the dual-type disks.

Figure 9:
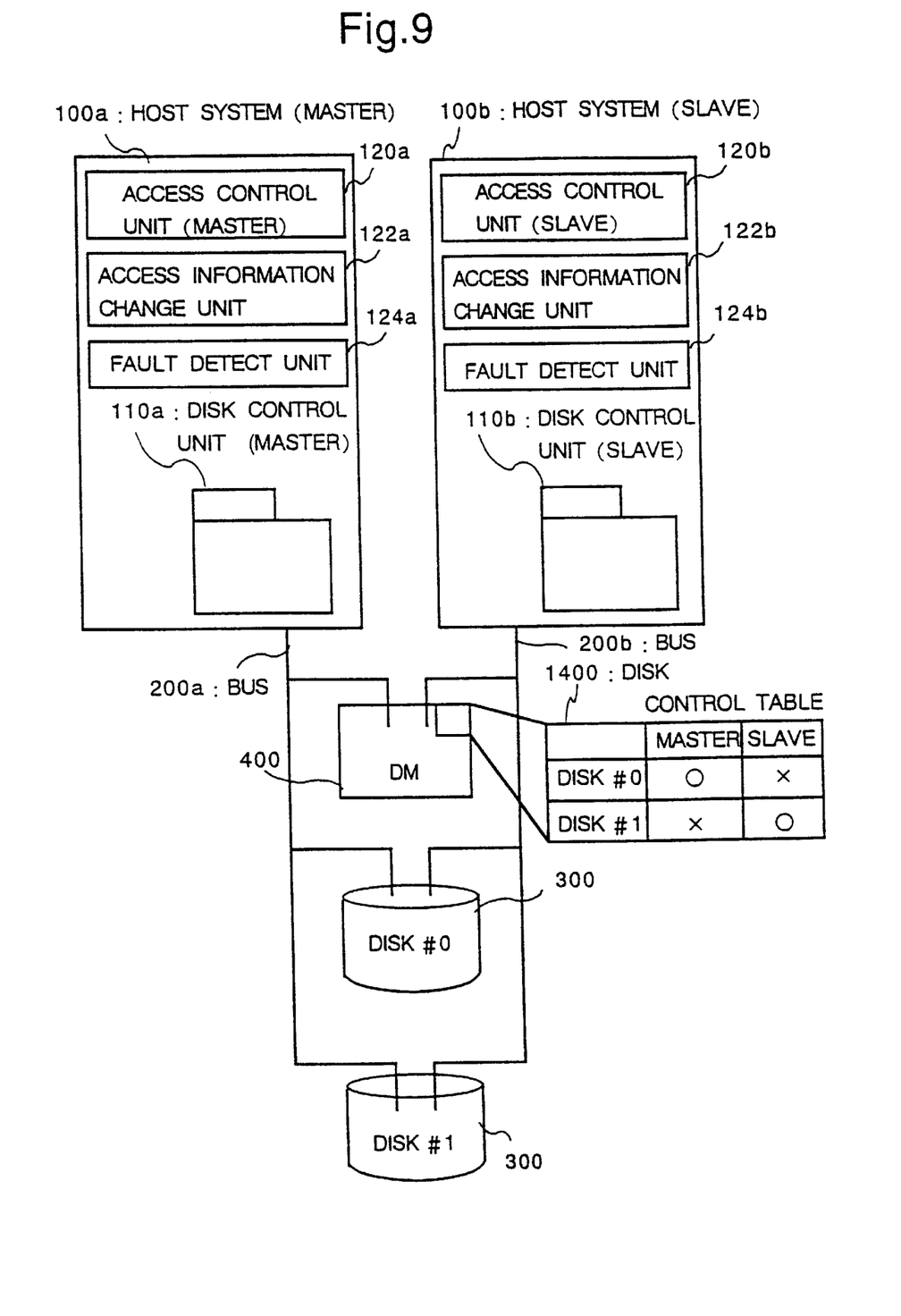
FIG. 9 is a configuration of the data storage system of this invention.

FIG. 9 is a configuration of the data storage system of this embodiment.

Disk manager 400 is a disk subsystem control mechanism (hardware) having a disk interface such as the SCSI. Disk manager 400 is provided with a disk control table 1400 which registers accesses to the disks of the master and the slave as access permitted (O) or prohibited (X) as the access information. Access control units 120a and 120b refer to the disk control table 1400 to control accesses of host systems 100a and 100b to the disks. Access information change units 122a and 122b change the access information registered in the disk control table 1400 as necessary. Fault detect units 124a and 124b respectively detect faults occurring in host systems 100a and 100b.

Figure 10:
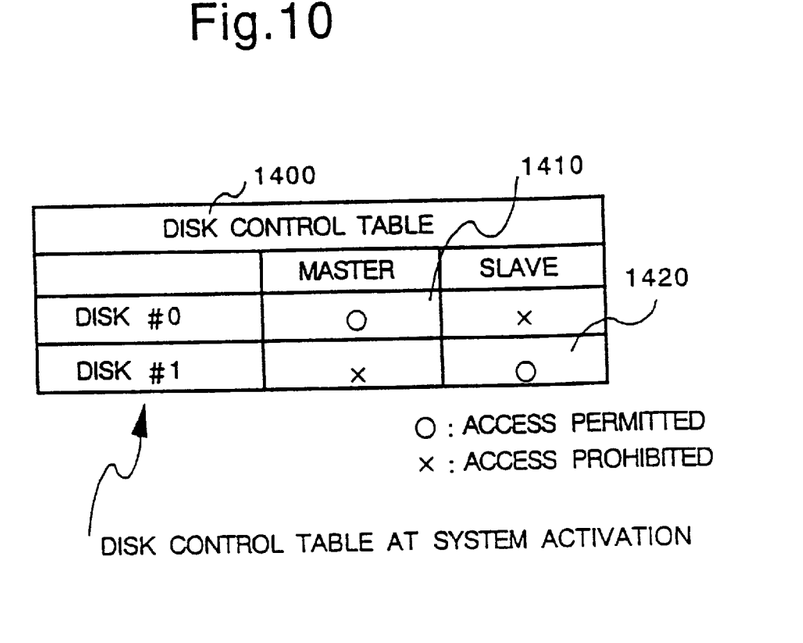
FIG. 10 shows an example of a disk control table of the data storage system of this invention.

FIG. 10 shows an example of the disk control table.

The disk control table in FIG. 10 indicates that the master is permitted to access disk #0 (1410) and the slave is permitted to access disk #1 (1420). The access information in this example is indicated by a O for access permitted and by an X for access prohibited. However, other values can also be applied.

The master disk control unit occupies disk #0 and the slave disk control unit occupies disk #1 and the master and the slave operate. The access information that indicates access permitted or prohibited is set on the disk control table of the disk manager at system implementation. Disks #0 and #1 can be accessed from any disk control units in light of the hardware configuration. However, the access control units control accesses so that only a permitted disk can be accessed.

The operation of access control units 120a and 120b is explained.

Disk control table 1400 is assumed to have the access information set prior to the system activation.

Disk manager 400 is equipped with a disk interface such as the SCSI. Access control units 120a and 120b can access the disk control table 1400 via this disk interface. Disk manager 400 has a dual port mechanism, which enables accesses from two systems.

Access control units 120a and 120b refer to the disk control table to determine whether the access to the disk is permitted or prohibited, and provide control so that an access to the disk to which access is prohibited is not made.

The application of the disk control table realizes the use of a plurality of disks by occupying each disk by each host system even when those disks could be physically accessed.

The access information of the disk control table may be changed at any time, as required by access information change units 122a and 122b. Access control units 120a and 120b refer to the disk control table of the disk manager at a certain time interval to check the access information. This enables the dynamic switching of the control (permitted or prohibited) of the access to the disks even after system activation.

The changing of the access information of the disk control table will now be explained with particularity.

When a fault has occurred in a system, the access information of the disk control table is rewritten as below to perform a shutdown operation safely without accessing to the disk (so as not to affect the other system). The system fault here refers to one which allows normal operation of the CPU, access control units, access information change units, and fault detect unit of the host system, for example, a problem with the network control card (not shown) of a local area network (LAN). The explanation is given for a case in which a fault has occurred in host system 100a of the master.

Fault detect unit 124a detects a fault occurred polls host system 100a. Then it reports the fault occurrence to the access information change unit 122a.

The access information change unit 122a rewrites the access information of disk #0, which indicates that the access from master 100a permitted, to access prohibited, and prohibits the access to disk #0 of master 100a, and rewrites the access information of disk #0 of the disk control table 1400 so that the access to disk #0 from slave 100b would be permitted.

Figure 11:
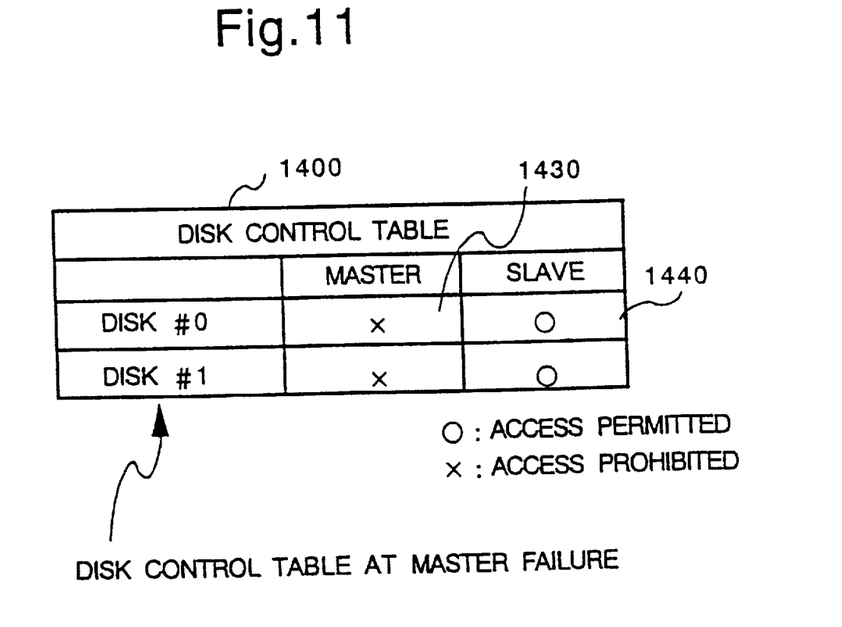
FIG. 11 shows the disk control table after access information is changed for the data storage system of this invention.

FIG. 11 shows the disk control table after the access information has been changed.

FIG. 11 shows that an access from the master to disk #0 is prohibited (1430) while an access from the slave to disk #0 is permitted (1440).

When access control unit 120b of the slave polls the disk control table, the shift in the access to disk #0 from prohibited to permitted is known.

At the time of system shutdown and reactivation for diagnosis, the master refers to the disk control table and knows an access to the disk is prohibited. Thus the master does not make an access to the disk. Therefore, the master does not interfere with the operation of the slave.

A case in which host system 100a of the master has shut down, rendering access control unit 120a, access information change unit 122a, and fault detect unit 124a disabled is explained next. In such a case, detection of system shut down is conducted by fault detect unit 124b of the slave.

Figure 12:
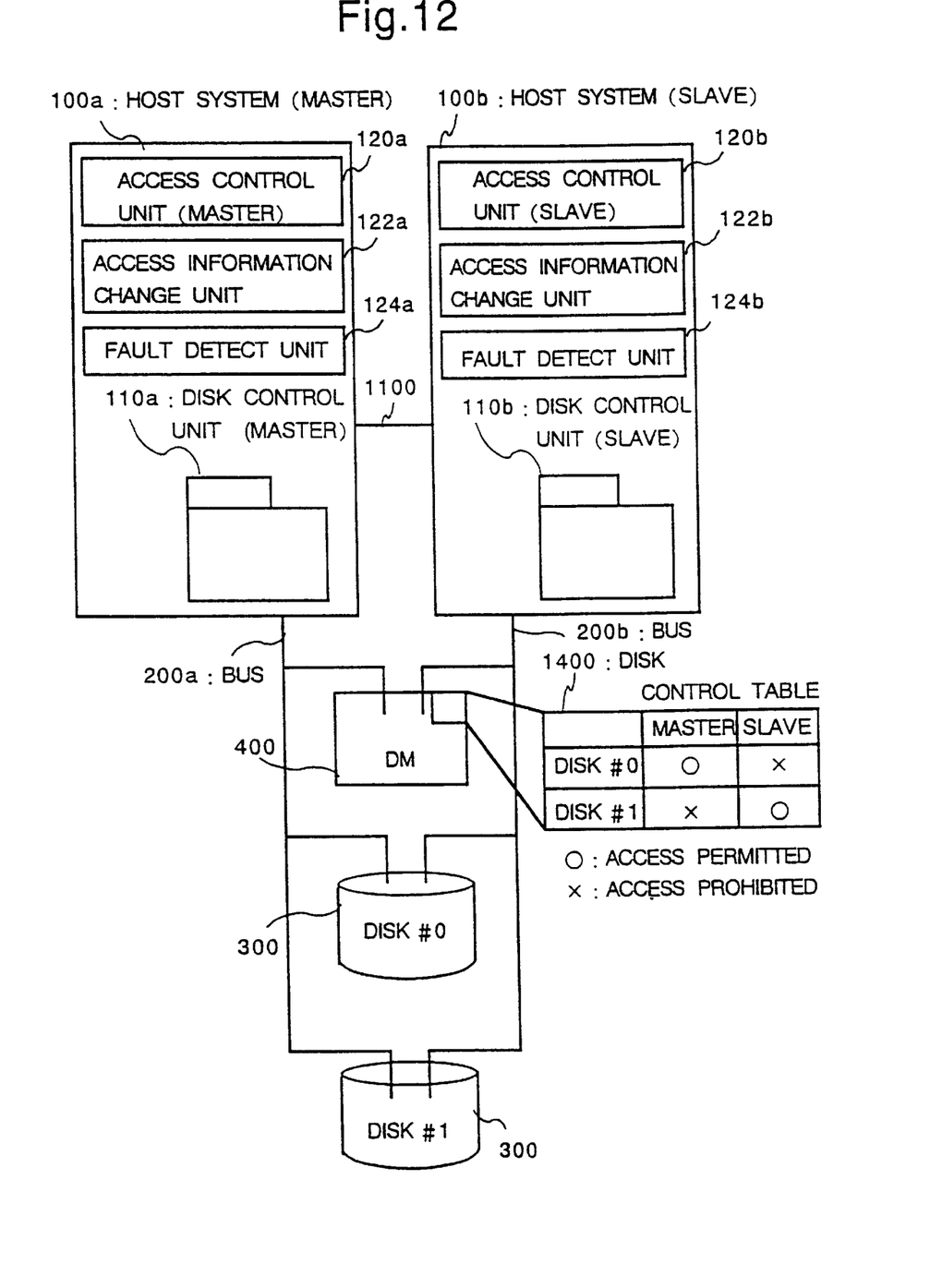
FIG. 12 is another system configuration of the data storage system of this invention.

FIG. 12 is a system configuration showing the detection of a fault in one system by the other.

In FIG. 12, a heartbeat signal line 1100 sends and receives heartbeat, a pulse which indicates the system is alive, between the master and the slave. The heartbeat is a pulse generated at a certain time interval so long as the system is alive. Normal operation of a system can be monitored by the heartbeat. If the heartbeat can be monitored at a certain interval, the system is operating normally, and if the heartbeat cannot be monitored, a fault can be detected. Fault detect unit 124b inputs the heartbeat to a heartbeat signal line 1100 and monitors it to detect a fault in the master. When a system fault is detected, fault detect unit 124b notifies access information change unit 122b of the fault occurrence in the master. Then access information change unit 122b changes the access information of disk #0 to which the master has been accessing. Changing of the access information is the same as that previously explained.

It is also possible that access information change units 122a and 122b update the contents of the access information on the disk control table at a certain interval even when the contents are unchanged in order to detect the occurrence of a fault. Each time access information change units 122a and 122b update the access information, the time-stamp (record of updating time and date) is also updated. Fault detect units 124a and 124b mutually check the time-stamp updated by the access information change unit of the other host system, and determine whether or not a fault has happened to the other host system when the time-stamp has not been updated. Post-processing of the fault occurrence is the same as that previously explained.

This embodiment has explained the data storage system for which accesses made by each host system to the disks are set as the access information on the disk control table, the access control units refer to the disk control table to control accesses made by each host system to the disks.

When the fault detect units detect a fault, the access information change units change the access information so as to prohibit an access to the disk of the host system in which the fault has been detected. Thus, a host system shut down due to a fault does not affect other host system.

The access information change units change the access information so that the disk being accessed from the host system in which the fault has been detected can be accessed from other host system. Thus, the disks are always made available.

Having thus described several particular embodiments of the invention, various alterations, modifications, and improvements will readily occur to those skilled in the art. Such alterations, modifications, and improvements are intended to be part of this disclosure, and are intended to be within the spirit and scope of the invention. Accordingly, the foregoing description is by way of example only, and not intended to be limiting. The invention is limited only as defined in the following claims and the equivalents thereto.

What is claimed is:

1. A data storage system connected to first and second host systems that execute an operating system, the data storage system being accessible by the first and second host systems and comprising:

a. first and second buses, each of the first and second buses having an interface;

b. a disk storage device connected to the first host system via the first bus and connected to the second host system via the second bus, the disk storage device storing the operating system; and c. a disk manager connected to the first host system via the first bus and to the second host system via the second bus, for simulating a disk storage device by responding to disk activation commands transmitted from the first and second host systems, wherein the disk manager transmits a disk activation completion signal and allows one of the first and second host systems, exclusively, to read the operating system stored in the disk storage device when the first and second host systems are activated.

2. The data storage system of claim 1, wherein
the disk manager is configured to be accessed before the disk storage device is accessed when one of the first and second host systems is activated, and
the disk manager gives priority to one of the first and second host systems in reading the operating system stored in the disk storage device, while keeping the other host system in a wait-mode for delaying reading of the operating system stored in the disk storage device, and, after the host system given priority has completed reading of the operating system stored in the disk storage device, the disk manager allows the other host system to read the operating system stored in the disk storage device.

3. The data storage system of claim 2, wherein the storage manager includes:

a bus switching mechanism connected to the first and second buses for selecting one of the first and second buses by switching, and for outputting bus connection information indicating which bus is selected;

a determination unit referring to the bus connection information for determining which of the first and second host systems accesses the disk storage device; and an access control unit for controlling exclusive access to the disk storage device by the first and second host systems in response to the determination unit for exclusive reading of the operating system stored in the disk storage device.

4. The data storage system of claim 3, wherein the access control unit freezes one of the first and second buses.

5. The data storage system of claim 3, wherein
the disk manager includes a read completion information storage unit for storing read completion information indicating completion of the reading of the operating system stored in the disk storage device by one of the first and second host systems, and
the access control unit refers to the read completion information storage unit for releasing exclusive control of access to the disk storage device after completion of the reading of the operating system by one of the first and second systems.

6. The data storage system of claim 5, wherein the reading completion information storage unit includes first and second read completion information storage units separately storing the read completion information indicating completion of reading of the operating system by the first and the second host systems, and
wherein the access control units make one of the first and second host systems wait to read operating system until the other host system completes reading of the operating system.

7. The data storage system of claim 6, wherein
one of the first and second buses is frozen by the disk manager via the access control unit, giving priority to the one of the first and second host systems connected to the other bus for reading the operating system stored in the disk storage device,
the host system connected to the other bus stores the read completion information in one of the first and second read completion information storage units upon completion of reading of the operating system, and
the access control units refer to one of the read completion information storage units to release the frozen bus.

8. The data storage system of claim 4, wherein the interface is a Small Computer System Interface (SCSI), and the access control unit freezes a bus by delaying a reply to a disk activation command of the SCSI.

9. A data storage control method for a data storage system connected to first and second host systems activated by reading an operating system from the data storage system, the data storage system having a disk storage device storing the operating system and a disk manager simulating a disk storage device, the method comprising:

issuing a first disk activation command from the first host system to the disk manager;

issuing a second disk activation command from the second host system to the disk manager;

in response to the first disk activation command, issuing a first disk activation completion signal to the first host system and granting the first host system access to the disk storage device;

reading the operating system from the disk storage device to the first host system;

in response to the second disk activation command, delaying transmission of a second disk activation completion signal to the second host system and denying the second host system access to the disk device;

transmitting the second disk access completion signal from the disk manager to the second host system and granting the second host system access to the disk storage device upon detecting completion of the reading of the operating system by the first host system; and reading the operating system from the disk storage device to the second host system.

10. The data storage control method of claim 9, comprising writing read completion information indicating completion of reading of the operating system by the first host system from the first host system to the disk manager, wherein transmitting the second disk access completion signal includes monitoring the read completion information and transmitting the second disk access completion signal to the second host system after the first host system writes the read completion information to the disk manager.

11. A data storage system connected to first and second host systems and accessed by the first and second host systems, comprising:

first and second buses, each of the first and second buses having an interface;

a disk storage device connected to the first host system via the first bus and connected to the second host system via the second bus, for storing data;

a disk manager including a disk control table for storing access information indicating permissibility of access to the disk storage device from the first and second host systems, the disk control table having a first entry including first access information indicating whether the first host system is permitted to access the disk storage device, the first access information having a first time stamp, and a second entry including second access information indicating whether the second host system is permitted to access the disk storage device, the second access information having a second time stamp;

a first access control unit for reading the first access information stored in the disk control table for controlling access to the disk storage device by the first host system; and a second access control unit for reading the second access information stored in the disk control table for controlling access to the disk storage device by the second host system;

first and second access information change units, respectively associated with the first and second host systems, for updating the first and second access information and the first and second time stamps;

a first fault detection unit associated with the first host system for analyzing the second time stamp and outputting a first fault detection signal when the second time stamp indicates that the second access information change unit has not updated the second access information within a first time interval;

a second fault detection unit associated with the second host system for analyzing the first time stamp and outputting a second fault detection signal when the first time stamp indicates that the first access information change unit has not updated the first access information within a second time interval, wherein, in response to the first fault detection signal, the first access information change unit changes the second access information to prevent the second system from accessing the disk storage device and, in response to the second fault detection signal, the second access information change unit changes the first access information to prevent the first host system from accessing the disk storage device.

* * * * *